May 3, 1932.  E. M. PORTER  1,856,112
FILM REEL TO FACILITATE FILM THREADING
Filed Feb. 6, 1931
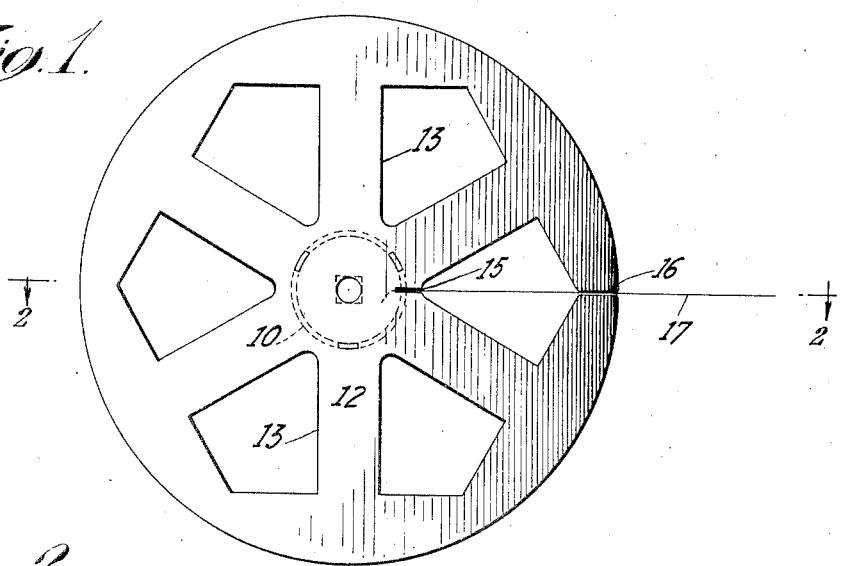
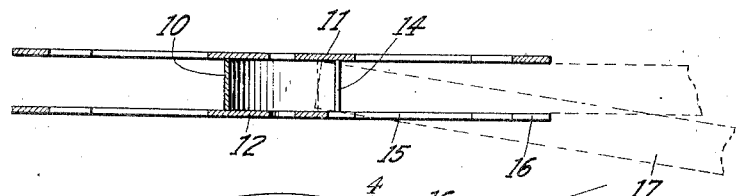
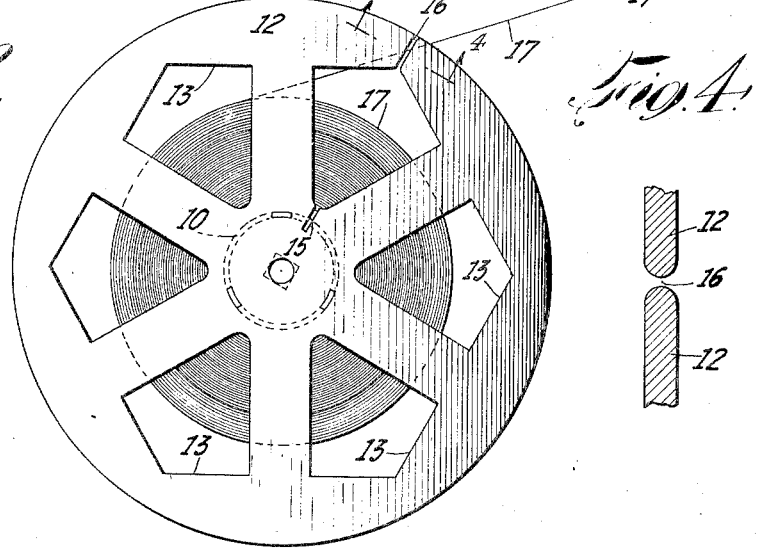 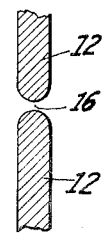
Inventor
Everett M. Porter.
By his Attorneys Patented May 3, 1932

1,856,112

UNITED STATES PATENT OFFICE

EVERETT M. PORTER, OF BROOKLYN, NEW YORK, ASSIGNOR TO INTERNATIONAL PROJECTOR CORPORATION, OF NEW YORK, N. Y., A CORPORATION OF DELAWARE

FILM REEL TO FACILITATE FILM THREADING

Application filed February 6, 1931. Serial No. 513,913.

This invention relates to film reels and has especial reference to an improved, simple, economical light-weight reel for use with motion picture projectors, particularly amateur projectors.

The main object of the invention is to provide a simple, light-weight reel with means for permitting relatively quick and easy attachment of the end of the film to the reel.

A further object of the invention is to provide an improved construction of reel which will permit the beginning of the film to be threaded in the reel by a sidewise introduction instead of introducing the end into the reel along a radial line.

Further and more specific objects, features and advantages will more clearly appear from a consideration of a specification hereinafter taken in connection with the accompanying drawings which form part of the specification and which illustrate a present preferred form of the invention.

In general and brief terms the invention comprises the provision of a reel of such simple construction that the film can be laterally slipped into place on the reel by passing it laterally through one of the side plates. This lateral introduction of the film is effected by providing one of the side plates or flanges with a slot, preferably radial, through which the end of the film can be laterally passed or threaded. Preferably this slot in the said plate at one end is in registration with a slot or opening in the central hub of the reel so that the end of the film, after the lateral introduction, will be received in the slot and the film can be wound on the hub. After introduction in this manner, and the reel positioned on the machine to receive the film, the film may be wound, and the film never assumes a 90° radial position with respect to the center of the reel. It, therefore, will be impossible for the film to be pulled out through the lateral radial slot. Preferably the slot is radial but not continuous, since most reels in use are formed with central and spaced annular portions spaced by spokes for intervening between the spaces to make the reel light. However, if the side plates are solid the radial slots will be continuous.

The preferred form of the invention is shown in the drawings, of which:

Fig. 1 is a side elevational view of the reel embodying this invention;

Fig. 2 is a horizontal section taken on the line 2—2 of Fig. 1;

Fig. 3 is an elevational view showing the film substantially wound up on the reel; and Fig. 4 is a section taken on the line 4—4 of Fig. 3.

The invention in the preferred form shown in the drawings is an improved reel for having ribbons of material, such as film for example, wound on it. This improved reel comprises a central hub 10 preferably of sheet metal bent into cylindrical form and side plates or flanges 11 and 12, preferably circular. These side plates may be fastened to the hub 10 in any desired manner. The construction of the plates may be solid, or as shown in the usual form may be formed of a central portion, an outer annular portion, with intervening spokes 13 between which are formed open spaces. Preferably the periphery of the hub 10 is provided with a slot 14 therein, parallel to the axis of the hub. In registration with one end of this slot 14, there is formed in one of the plates such as 12, a radial slot 15 opening into one of the intervening spaces between the spokes 13. The slot 16 is cut through the spaced annular portion of this plate 12 and in line with the slot 15. If the plate 12 were of a solid plate the radial slots formed would be continuous from near the center to the outward circumference of the plate.

As shown in Fig. 1 when it is desired to quickly attach the film to the reel the end portion is disposed as shown in Fig. 1 and guided laterally into the slot 15 and through the slot 16 to bring the film in between the two plates 11 and 12 with the end of the film extending into the slot 14 in the hub. After this attachment the reel is then turned to wind a few inches of the film on the hub and the reel is ready to be put into the machine. By reference to Fig. 3 it will be seen that after the film is placed on the reel and during the operation of its being wound on the reel it will assume a radial position with respect to the center of the reel, and therefore, it will be impossible for the film to be pulled out through the slot 16. Therefore, the slot can be provided to permit its ready and almost instantaneous insertion of the film without any danger of the film jumping from the reel. Noting Fig. 4 it will be seen that the edges of the reel around slot 16 are curved so as to prevent the film from having any tendency to pass out laterally when being wound on or off of the reel.

This simple improved form of reel constitutes the invention and includes the provision of the peripheral slot in the hub, and constitutes simple and efficient means in one of the plates of the reel for the ready insertion of the film in connection with the hub. The invention requires no alteration of the reel except in the formation of the slots therein. It is simple, economical, and exceedingly effective to this desired end. Those who have had occasion to connect film to reels, fully realize the advantage of such simple improvement.

While the invention has been described in detail and with respect to a present preferred form thereof, it is not to be limited to such details and forms since many changes and modifications may be made in the invention without departing from the spirit and scope of the invention in its broadest aspects. Hence it is desired to cover any and all forms and modifications of the invention which may come within the language or scope of the appended claim.

What is claimed, is:

A film reel which comprises a central hub having a radial slot therein parallel to the axis of the hub, a lateral plate fixed to one face of said hub, said plate comprising a central portion, an annular ring portion and connected spokes, said plate having a radial slot extending from near the center radially to an opening between the spokes, the plate also having a radial slot in the annular ring portion in line with the first mentioned radial slot permitting lateral insertion of a film through said plate for quick connection to the hub, the edges of said slot in the annular ring portion being doubly curved at both faces to permit ready insertion of the film and to prevent the film from having any tendency to pass out laterally as it is being wound or unwound from the reel.

In testimony whereof I have hereunto set my hand.

EVERETT M. PORTER.